United States Patent [19]

Timothy

[11] Patent Number: 4,580,317
[45] Date of Patent: Apr. 8, 1986

[54] PORTABLE HANGER FOR DEER AND OTHER ANIMAL CARCASSES AND METHODS

[75] Inventor: Richard G. Timothy, Kearns, Utah

[73] Assignee: Guy Francis Timothy, Kearns, Utah

[21] Appl. No.: 685,878

[22] Filed: Dec. 24, 1984

[51] Int. Cl.$^4$ .......................... A22B 1/00; A22C 15/00
[52] U.S. Cl. .......................................... 17/45; 17/44.2; 294/79
[58] Field of Search .......................... 17/44, 44.2, 44.3; 294/79

[56] References Cited

U.S. PATENT DOCUMENTS

| | | | |
|---|---|---|---|
| 1,485,161 | 2/1924 | Blake | 17/44.2 X |
| 1,505,665 | 8/1924 | Paice | 17/44.2 X |
| 2,582,322 | 1/1952 | Ferguson | 294/79 |
| 4,027,357 | 6/1977 | Morris | 294/79 X |

Primary Examiner—Willie G. Abercrombie
Attorney, Agent, or Firm—Lynn G. Foster

[57] ABSTRACT

The disclosed portable hanger comprises two cantilevered rigid support arms pivotably joined only at the proximal ends thereof at a central connection site so as to establish and maintain a predetermined included angle between the two arms during use. The carcass is releasibly supported on hooks carried at the distal end of each arm, while the hanger itself is suspended at eyelet structure located directly adjacent to the central arm connection site. Each carcass engaging hook is pivotably connected at the distal end of the associated arm. The arms and eyelet structure may be rotated into a superimposed relationship for storage and portability. When oppositely rotated, the mentioned included angle is rigidly established by a stop tab carried by the eyelet structure and interposed between the arms adjacent the central connection site.

11 Claims, 5 Drawing Figures

4,580,317

PORTABLE HANGER FOR DEER AND OTHER ANIMAL CARCASSES AND METHODS

FIELD OF INVENTION

The present invention relates generally to the suspension of an animal carcasses and more particularly to a novel portable hanger for deer or other animal carcass and related methods.

PRIOR ART

The cooling, handling, storage and curing of an animal carcass typically entails suspension of the carcass in the air above the ground or floor. The prior art has proposed various and sundry structures, such as hangers, for so suspending an animal carcass. These prior art structures are typically complex and, therefore, expensive, awkward to use, ineffective, often dangerous, require an excessive number of parts entailing a complex manufacturing procedure, which may not be readily manipulated by one man, lack simplicity, are difficult to use and are not conveniently carried from place to place for use at various and sometimes remote sites.

For example see the following U.S. Patents which are of general interest: U.S. Pat. Nos. 482,633, 1,023,148, 1,085,439, 1,485,161, 1,503,738, 2,093,732, 2,169,928, 4,027,357.

BRIEF SUMMARY AND OBJECTS OF THE INVENTION

In brief summary, the present invention overcomes or substantially alleviates the cited prior art problems by provision of a novel hanger for suspending the carcass of a deer or other animal above the floor or the ground during cooling, handling, storage and curing. The present hanger comprises two cantilevered rigid support arms joined only at the proximal ends thereof, at a central connection site, so as to establish and maintain a predetermined included angle between the two arms during use. The carcass is releasibly supported at the distal end of each arm, while the hanger itself is suspended by structure located closely juxtaposed the central arm connection site.

In its presently preferred form, pivot structure pivotably connects the arms of the central connection site and the arm may be rotated with the suspension structure into superimposed relationship for storage and portability. When oppositely rotated into the "as used" position, the mentioned included angle is defined by stop structure interposed between the arms adjacent the central connection site. A carcass engaging hook is also pivotably connected at the distal end of each arm.

With the foregoing in mind, it is a primary object of the present invention to provide a novel hanger for an animal carcass, and related methods.

It is a further paramount object to provide a novel animal carcass hanger, and related methods, having one or more of the following features and advantages: noncomplex, simplified construction, highly reliable and effective, inexpensive, easy to use, safe, utilizes few parts, utilizes a simplified manufacturing procedure, and can be readily carried from place-to-place and facilely used by one man.

Another object of significance is the provision of a novel animal carcass hanger comprising two rigid cantilevered arms joined only at the proximal ends thereof, at a central connection site.

These and other objects and features of the present invention will be apparent from the detailed description taken with reference to the accompanying drawings.

DETAILED DESCRIPTION OF THE ILLUSTRATED EMBODIMENT

Figure 1:
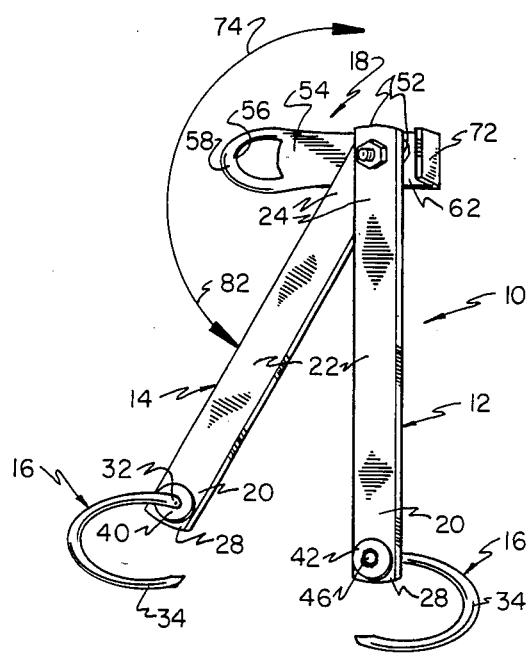
FIG. 1 is an perspective view of an animal carcas hanger, according to the present invention, partly rotated from its "as used" position to its superimposed, compacted storage and portable transporting position.

References now made in detail to the Figures F, wherein like numerals are used throughout to designate like parts. The Figures illustrate a presently preferred animal carcass hanger, generally designated 10. The hanger 10 comprises two rigid cantilevered arms, generally designated 12 and 14, pivotable carcass engaging hook structure, generally designated 16 located at the distal end of each support arm or bar 12 and 14, and hanger suspension structure, generally designated 18, disposed at a central site which is superimposed upon and pivotably joined to the superimposed proximal ends of the arms. Structure 18 also provides arm-engaging stop structure, as hereinafter explained in greater detail.

The arms at 12 and 14 are identical though of opposite hand orientation when assembled as part of the hanger 10. Each arm or bar 12 and 14, exclusive of apertures therein, is a uniform, rectangular cross-section throughout the length thereof as shown best in FIGS. 4 and 5. The arms or bars 12 and 14 are elongated, having a length many times greater than the width thereof. Each arm or bar 12 and 14 comprises a distal end 20, a central region 22 and a proximal end 24. Each bar or arm 12 and 14 is preferably formed of mild steel or other rigid material having sufficient structural integrity to carry the weight of an animal carcass without material deflection, deformation or structural failure.

Figure 4:
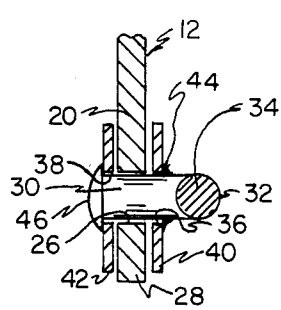
FIG. 4 is an enlarged fragmentary cross-section taken along lines 4—4 of FIG. 2.

The distal end 20 of each arm 12 and 14 has a centrally disposed a fore-to-aft aperture 26 (FIG. 4). Aperture 26 is disposed short distance away from the distal edge 28 of each of the bars 12 and 14. The aperture 26, in each case, is used to pivotally connect the distal end of each bar 12 and 14 to carcass engaging hook structure 16.

More specifically, each carcass engaging hook structure 16 comprises a pivot pin 30, which integrally merges at elbow 32 with a U-shaped hook 34, of solid cross-sectional configuration and illustrated as being of essentially the same diameter as the pivot pin 30. Pivot pin 30 passes rotatably through the associated aperture 26, and also through apertures 36 and 38 in annular washers 40 and 42, respectively. The pivot pin 30 is non-rotatably joined to the annular washer 40 at annular weld site 44 and to annular washer 42 at enlarged head 46, the pivot pin 30 itself. Thus, the washers 40 and 42 rotate with the hook 44, in each case, to accommodate engagement with an animal carcass and suspension of the same in the air above the floor or ground, as hereinafter explained in greater detail.

The proximal end 24 of each arm or bar 12 and 14 comprises an aperture 50. The two apertures 50 are superimposed in alignment one with the other, the bars 12 and 14 being in parallel but offset planes. See in particular FIG. 5. Each aperture 50 is essentially disposed in a direction perpendicular to the axis of the bar 12 or 14 and is located a short distance from the proximal edge 52 of each bar or arm 12 and 14. The superimposed relationship between the proximal ends 24 and the two apertures 50 therein accommodate pivotal connection between the two bars or arms in a manner and for purposes hereinafter explained in greater detail.

Figure 3:
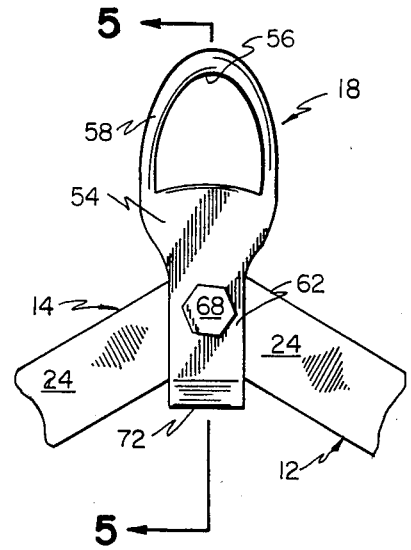
FIG. 3 is an enlarged fragmentary elevation of the central area of the hanger in the "as used" position of FIG. 2.

The structure 18 comprises a generally flat body 54 which is enlarged in an upward direction, as viewed in FIG. 3, to create an eyelet 56, formed by an elevated loop 58, having in the illustrated embodiment a circular cross-section. Body 54 is superimposed over both arms and is in a plane parallel to but offset from the planes containing the arms. A hook 60 (FIG. 2), rope or the like is placed through the eyelet 56 to suspend the hanger as illustrated in FIG. 2.

Figure 5:
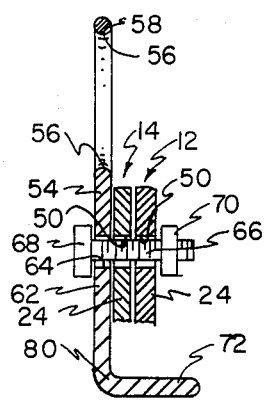
FIG. 5 is an enlarged fragmentary cross-section taken along lines 5—5 of FIG. 3.

The body 54 is constricted or divergently tapered in a downward direction to form a necked down or narrowed region 62, through which an aperture 64 is located in a direction perpendicular to the longitudinal axis of the structure 18. See FIG. 5. The aperture 64 is superimposed upon and in alignment with the previously described aligned apertures 50, in the proximal ends 24 of the arms 12 and 14 as illustrated in FIG. 5. The proximal ends 24 and the structure 18 are rotatably and pivotably connected to each other, using in the illustrated embodiment, a pivot pin 56 comprising a nut and bolt assembly, the bolt having a head 68 and a threaded shaft bond upon which a nut 70 is threaded. Thus, the structure 18 and the arms 12 and 14 may be relatively rotated by the user, within certain limits, as hereinafter set forth.

The structure 18 further comprises an arm abuttment or a stop tab 72. Stop tab 72 is perpendicular to the remainder of the structure 18 and, therefore, perpendicular to the axis of the arms 12 and 14. Stop tab 72 is located to one side of two arms directly adjacent the centrally disposed connection site of the proximal ends of the arms.

Figure 2:
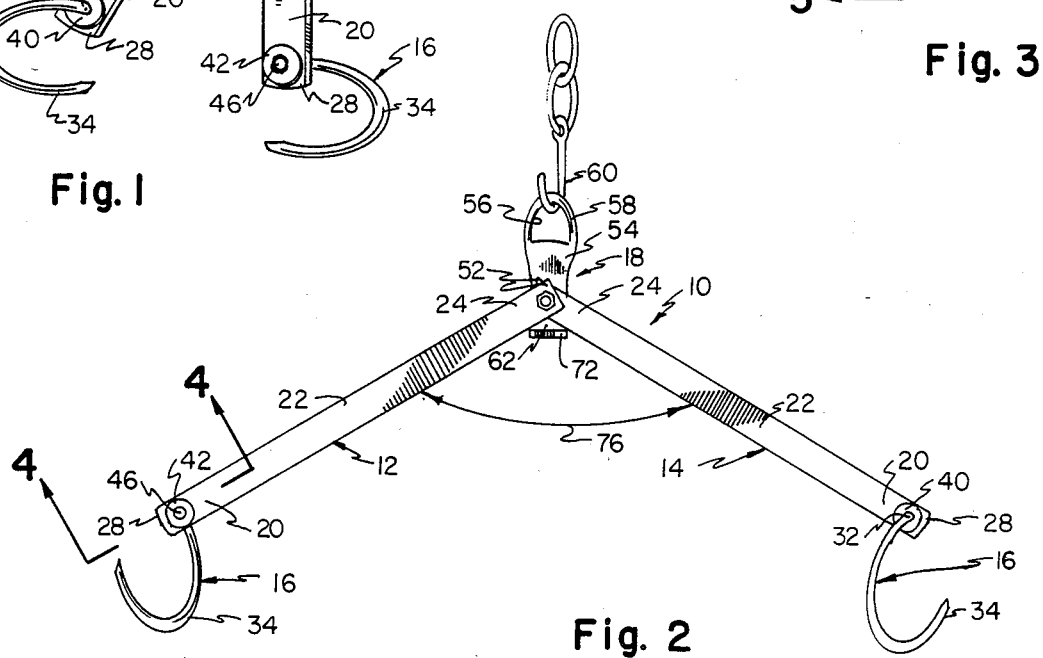
FIG. 2 is an elevation of the hanger of FIG. 1, showing the hanger in its "as used" position.

Thus, when the arms 12 and 14 are relatively rotated in the direction illustrated by arrow 74 in FIG. 1, the arms become oriented in the "as used" position of FIG. 2 with the stop tab 72 defining the interior angle 76 there between. The contiguous engagement between the stop tabs 72 and both proximal ends 24 of the arms 12 and 14 defines the included angle. Thus, the stop tab 72 prevents further rotation and establishes a fixed apex between the arms 12 and 14 in the "as used" position of FIG. 2.

It should be noted from FIG. 5 that the stop tab 72 is integrally connected to the necked down body portion 62 at a 90° elbow.

With the foregoing in mind, the hanger 10 may be relatively rotated as illustrated by arrow 82 in FIG. 1, to reduce the length thereof, by superimposing the arms 12 and 14 over each other and by superimposing the central structure 18 over the two arms. With the hanger then in its collasped position, the unit may be conveniently carried by user or in other ways transported from place to place for use at spaced and sometimes romote sites. Thus, a deer hunter may collapse the hanger 10 and take it with him while deer hunting so that, upon success, the deer carcass may be hung in an elevated position above the ground to accommodate cooling and temporary storage. The "as used" position is obtained by merely rotating the arms 12 and 14 in the direction illustrated by arrow 74 of FIG. 1 to obtain the position of FIG. 2 which position is retained by force of gravity, the outwardly and downwardly directed arms 12 and 14 engaging the stop tab 72.

The present hanger may also be used in a cold storage locker as well as other locations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A portable hanger for an animal carcass comprising:

first and second elongated rigid cantilevered pivotable arms, each having a distal end, a relatively long central portion and a proximal end;

carcass supporting and engaging means disposed at the distal end of each elongated cantilevered arm;

means pivotably connecting the proximal ends of the two arms at a central hanger site only without any cross brace structure whereby the arms may be relatively pivotal in one direction so that one arm becomes superimposed upon the other arm, for storage, and in the other direction so that the two arms are oppositely extending and downwardly angularly disposed at an included angle less than 180° in respect to each other when in use;

one way stop means interposed only between the proximal ends of the two arms immediately adjacent the central hanger site when so angularly disposed to limit the amount of downward relative pivotable displacement of the arms in the other direction thereby defining the included angle of less than 180° between the arms when the arms are oppositely extending and angularly disposed in respect to each other and the proximal ends are contiguous with the stop means during use;

means associated only with the arms at the pivotably connected proximal ends thereof for suspending the hanger.

2. A hanger for an animal carcass comprising:

a first and second elongated rigid cantilevered arms;

means at a free end of each arm releasibly supporting an animal carcass;

the arms being connected to each other without any cross brace structure solely at proximal ends thereof at a central hanger connection site;

means closely juxtaposed the central hanger connection site establishing and maintaining a predetermined downwardly sloped included angle less than 180° between the arms when supporting the animal carcass;

central hanger suspension means closely juxtaposed the central hanger connection site and associated only with the proximal ends of the arms disposed at the central hanger connection site.

3. A hanger according to claim 2 wherein the free end means each comprise hook means for engaging and supporting the animal carcass.

4. A hanger according to claim 2 wherein the proximal ends of the arms are superimposed and relatively rotatably connected by pivot means.

5. A hanger according to claim 4 wherein the hanger suspension means are non-rotatably joined to the pivot means.

6. A hanger according to claim 2 wherein the included angle establishing and maintaining means comprise rigid abutment means contiguously interposed between the proximal ends of the said less than 180° included angle thereby spanning across said included angle only at the central hanger connection site.

7. A hanger according to claim 6 where the proximal ends of the arms are rotatably connected by pivot means and the rigid abutment means are non-rotatably connected to the pivot means.

8. A hanger according to claim 2 wherein the closely juxtaposed means and the hanger suspension means comprise a single structural member which is superimposed, at least in part, upon at least one arm.

9. A method of hanging an animal carcass on a hanger comprising the steps of:
- pivotably connecting two rigid elongated bars without any cross brace structure solely at overlapped juxtaposed proximal ends of the bars disposed at a central hanger site;
- relatively rotating the bars in the first direction into a superimposed relationship during storage, transportation and non-use;
- relatively rotating the bars in the opposite direction into a cantilevered downwardly directed angular relation and structurally holding the bars only directly adjacent the pivotable connection site between the bars against collapse at a predetermined minimum included angle of less than 180° therebetween during use;
- suspending the hanger in the air from a single central hanger location only and suspending the animal carcass from the distal end of the bars.

10. A method of making an animal carcass hanger comprising the steps of:
- connecting two rigid elongated cantilevered bars without cross brace structure solely via centrally disposed fastener structure rotatably joining the superimposed proximal ends of the bars;
- connecting centrally disposed hanger suspension structure at one central hanger site only to the proximal ends of the bars by which the hanger is releasibly suspended in the air at a single central hanger suspension location;
- interposing stop structure centrally between the proximal ends of the bars only at the single central hanger suspension location to limit the extent to which the bars may be relatively rotated thereby defining a downwardly directed included angle of less than 180° between the bars.

11. A portable hanger for an animal carcass comprising:
- first and second elongated rigid cantilevered arms, each having a distal end and a proximal end;
- carcass engaging and supporting means disposed at the distal end of each elongated cantilevered arm;
- centrally located means for suspending the hanger;
- means pivotably connecting the proximal ends of the two arms and the centrally located means in overlapped relation one upon the other seriatum whereby the arms and the centrally located means may be respectively relatively pivoted in one direction so that the arms and the centrally located means are superimposed upon each other in compact relation or in the other direction so that the two arms extend oppositely outward and downward so as to be angularly disposed in respect to each other with the centrally located means extending upwardly;
- one way stop means angularly connected to the centrally located means and interposed between the proximal ends of the two arms when so angularly disposed to limit the amount of relative pivotable displacement of the arms in the other direction thereby defining the included angle between the arms when the arms are angularly disposed in respect to each other and the proximal ends are contiguous with the stop means.

* * * * *